(12) United States Patent  
Mills (10) Patent No.: US 7,832,355 B2
(45) Date of Patent: Nov. 16, 2010

(54) ANIMAL FEEDER

(76) Inventor: Frances Kay Mills, 3550 N. Lake Shore Dr., Suite 1103, Chicago, IL (US) 60657

( * ) Notice: Subject to any disclaimer, the term of this patent is extended or adjusted under 35 U.S.C. 154(b) by 98 days.

(21) Appl. No.: 12/060,290

(22) Filed: Apr. 1, 2008

(65) Prior Publication Data

US 2009/0241840 A1    Oct. 1, 2009

(51) Int. Cl.
*A01K 5/02* (2006.01)
(52) U.S. Cl. .................................................. 119/51.02
(58) Field of Classification Search ............. 119/51.02, 119/51.12, 51.5, 61.5, 63
See application file for complete search history.

(56) References Cited

U.S. PATENT DOCUMENTS

| | | | | |
|---|---|---|---|---|
| 3,631,840 A * | 1/1972 | McCormack | ............. | 119/51.12 |
| 4,510,495 A * | 4/1985 | Sigrimis et al. | .......... | 340/10.34 |
| 5,150,664 A * | 9/1992 | Kirk | ......... | 119/51.12 |
| 5,231,953 A * | 8/1993 | Garrett | ...... | 119/61.52 |
| 5,570,655 A * | 11/1996 | Targa | ....... | 119/51.02 |
| 5,574,470 A * | 11/1996 | de Vall | ....... | 343/895 |
| 6,044,795 A * | 4/2000 | Matsuura et al. | ....... | 119/51.02 |
| 6,318,291 B1 * | 11/2001 | Wolanski | .......... | 119/61.5 |
| 6,349,671 B1 | 2/2002 | Lewis et al. | | |
| 6,446,574 B2 | 9/2002 | Bickley | | |
| 6,766,766 B1 * | 7/2004 | Elliott | ....... | 119/57.92 |
| 7,073,461 B2 * | 7/2006 | Gonet | ....... | 119/61.5 |
| 2005/0061252 A1 * | 3/2005 | Meeks et al. | ........ | 119/51.02 |
| 2005/0066905 A1 * | 3/2005 | Morosin et al. | ........ | 119/51.02 |
| 2005/0217591 A1 | 10/2005 | Turner et al. | | |
| 2005/0252457 A1 | 11/2005 | Morosin et al. | | |
| 2005/0284382 A1 * | 12/2005 | Stantchev et al. | ........ | 119/51.02 |
| 2006/0249088 A1 * | 11/2006 | Eu | ........ | 119/51.02 |
| 2007/0144446 A1 * | 6/2007 | Neckel | ........ | 119/51.02 |
| 2008/0105205 A1 * | 5/2008 | Goehring | ........ | 119/51.02 |

OTHER PUBLICATIONS

International Search Report in corresponding international application No. PCT/US2009/039047.

* cited by examiner

*Primary Examiner*—Rob Swiatek
*Assistant Examiner*—Ebony Evans
(74) *Attorney, Agent, or Firm*—August Law, LLC; George Willinghan (57) ABSTRACT

An animal feeder and animal feeding system is provided that utilizes radio frequency identification technology to permit animals selective access to food. The animal feeder includes a universal base containing all of the necessary control electronics including a radio frequency transceiver and antenna. A given number of pre-defined codes are associated with sets of removable dishes and transponders. The transponders are arranged for attachment to an animal. All dishes and transponders in a given set are associated with the same code and can be used interchangeably. The dishes are sized and shaped to be fit into the base, and while a given dish is disposed in the base, the dish communicates or programs the control electronics with the pre-defined code associated with the dish. Therefore, when an animal wearing a transponder from the same set as that dish approaches the animal feeder, the control electronics recognize the animal and open a lid to permit access to the food contained within the dish.

37 Claims, 6 Drawing Sheets

ANIMAL FEEDER

FIELD OF THE INVENTION

The present invention relates to products for animals and in particular to feeders for animals.

BACKGROUND OF THE INVENTION

Feeding of pets and animals can be complicated by the feeding schedules of the animals, the dietary constraints of the animals and the interactions among multiple animals vying for a common source of food. For example, a dominant animal may not allow other animals to eat food. In another example, different animals housed and fed in a common area, for example a dog and a cat in the same household, are being given different feeds. In addition to a difference in diet being dictated by animal species, other causes of different diets include stage-of-life, i.e., kitten, puppy, adult, senior, temporary illness, chronic medical condition, illness prevention, obesity and pickiness.

Feeding a single animal once or twice a day can be difficult enough for owners that have demanding or erratic schedules due to other family and work commitments. The additional burden of having conflicting feeding schedules, frequent feeding schedules or stringent dietary requirements can present an almost impossible situation. Solutions such as physically separating the animals at feeding time, standing guard as the animals eat to ensure each animal eats only its own food and making choices that could compromise the nutrition or health of an animal are not acceptable. Therefore, an automated, flexible, easy to use and cost effective feeding system for animals is needed that provides for the desired level of control over the feeding of animals and in particular of multiple animals housed in a common location.

SUMMARY OF THE INVENTION

Systems and methods in accordance with the present invention provide for an animal feeder and animal feeding system that permits the controlled access to food by animals using radio frequency identification technology to identify properly tagged animals and to allow those animals and only those animals access to food contained within the feeder associated with a given animal. The system utilizes a universal base containing all of the necessary control electronics in combination with a given number of sets of removable dishes and transponders. Each set of dishes and transponders are associated with a single code, and the placement of a dish of a given set within the animal feeder programs the animal feeder for that code as long as the dish remains within the feeder. Only tags from the same set can activate and open the feeder. Detection of other transponders causes the feeder to close or to remain closed. The transponders are arranged to be attached to or worn by animals.

In one embodiment, the present invention is directed to an animal feeder that includes a base having a cavity having an opening, a radio frequency transceiver capable of receiving radio frequency signals from a plurality of radio frequency transponders and a control unit in communication with the radio frequency transceiver and capable of interpreting radio frequency signals received by the radio frequency transceiver. The animal feeder also includes a removable dish sized to fit within the cavity and to be accessible through the opening and a code indication mechanism disposed in at least one of the base and the removable dish to communicate a pre-defined code to the control unit. In one embodiment, the animal feeder also includes a lid attached to the base and selectively positionable in either a closed position covering the opening or an open position. The removable dish is accessible through the opening when the lid is in the open position.

In one embodiment, the control unit is in communication with the lid, and the control unit, upon receipt of a radio frequency signal by the radio frequency transceiver containing the pre-defined code, permits positioning of the lid in the open position. The control unit, during an entire duration of receipt of any radio frequency signal interpreted to contain codes other than the pre-defined code, maintains positioning of the lid in the closed position. In one embodiment, the removable dish includes a plurality of separate compartments, and the lid also includes a plurality of open positions. Each open position corresponds to one of the plurality of separate compartments, and each separate compartment of the removable dish is accessible through the opening when the lid is in the corresponding open position. In one embodiment, the removable dish includes two separate compartments, and the lid has two open positions each open position corresponding to one of the two separate compartments.

The animal feeder can also include a biasing member disposed in the base and in contact with the lid. The biasing member biases the lid in the open position or the closed position. In one embodiment, the pre-defined code is a pre-defined radio frequency transponder emitted transmission frequency, a pre-defined alpha-numeric code or combinations thereof. In one embodiment, the code indication mechanism includes a radio frequency transponder disposed in the removable dish. In another embodiment, the removable dish is positionable in the cavity in a plurality of distinct orientations, and the code indication mechanism also includes a plurality of pre-defined codes. Each pre-defined code corresponds to one of the plurality of distinct orientations of the removable dish. In one embodiment, visual indicia of the pre-defined code are provided on at least one of the removable dish and the base.

In one embodiment, the code identification mechanism includes a tang extending from the removable dish and a plurality of switches disposed within the cavity. Each switch is associated with one of a plurality of pre-defined codes. The tang is in contact with one of the switches when the removable dish is disposed in the cavity. In another embodiment, the code identification mechanism includes a conductive bridge disposed in the removable dish and a plurality of electrical contacts disposed in the cavity. Each pairing of the electrical contacts corresponding to one of a plurality of pre-defined codes, and the conductive bridge is in contact with one pair of electrical contacts when the removable dish is disposed in the cavity. In another embodiment, the code identification mechanism includes a plurality of magnetic switches disposed in the cavity such that each magnetic switch corresponds to one of a plurality of pre-defined codes and a magnetic actuator disposed in the removable dish. The magnetic actuator actuates one of the magnetic switches when the removable dish is disposed in the cavity.

In one embodiment the animal feeder includes a radio frequency transponder that transmits the pre-defined code upon interrogation by the radio frequency transceiver. Preferably, the radio frequency transponder is arranged for attachment to an animal. Suitable radio frequency transponders include a passive transponder, a semi-passive transponder and an active transponder. In one embodiment, visual indicia of the pre-defined code are provided on the removable dish and the transponder. In one embodiment, a plurality of remote radio frequency transceivers is provided, each one in communication with the control unit and capable of receiving radio frequency signals from a plurality of radio frequency transponders. The control unit can also include a wireless communication mechanism. In addition, the base further can include an epoxy compound to encapsulate at least one of the radio frequency transceiver and the control unit. In one embodiment, the animal feeder includes a cooling mechanism in communication with the removable dish when the removable dish is disposed in the cavity.

The present invention is also directed to an animal feeding system having a base containing a cavity having an opening, a radio frequency transceiver capable of receiving radio frequency signals from a plurality of radio frequency transponders and a control unit in communication with the radio frequency transceiver and capable of interpreting radio frequency signals received by the radio frequency transceiver. The animal feeder also includes a plurality of removable dishes. Each removable dish is sized to fit within the cavity and to be accessible through the opening. The animal feeder includes a code indication mechanism disposed in the base and in each one of the removable dishes. In one embodiment, each removable dish communicates one of a plurality of pre-defined codes to the control unit. The animal feeder also includes a plurality of radio frequency transponders. Each radio frequency transponder transmits one of the plurality of pre-defined codes upon interrogation by the radio frequency transceiver.

In one embodiment, each radio frequency transponder is arranged for attachment to an animal. Suitable radio frequency transponders include a passive transponder, a semi-passive transponder and an active transponder. In one embodiment, the animal feeder includes a unique indicium associated with each one of the plurality of pre-defined codes. Each unique indicium is disposed on one of the plurality of removable dishes and one of the radio frequency transponders. In one embodiment, each indicium includes alpha-numeric strings, machine readable codes, colors, tactile markings or combinations thereof.

In one embodiment, the animal feeding system includes a lid attached to the base and selectively positionable in either a closed position covering the opening or an open position. A given removable dish disposed in the cavity is accessible through the opening when the lid is in the open position. In one embodiment, the control unit is in communication with the lid, and the control unit, upon receipt of a radio frequency signal by the radio frequency transceiver containing the pre-defined code communicated to the control unit from one of the plurality of removable dishes currently disposed in the cavity, permits positioning of the lid in the open position. In one embodiment, the control unit, during an entire duration of receipt of any radio frequency signal interpreted to contain codes other than the pre-defined code communicated to the control unit from the removable dish currently disposed in the cavity, maintains positioning of the lid in the closed position. In one embodiment, each removable dish includes a plurality of separate compartments, and the lid has a plurality of open positions. Each open position corresponds to one of the plurality of separate compartments, and each separate compartment of the removable dish is accessible through the opening when the lid is in the corresponding open position.

In one embodiment of the animal feeding system, each pre-defined code includes a pre-defined radio frequency transponder emitted transmission frequency, a pre-defined alpha-numeric code or combinations thereof. In one embodiment, the code indication mechanism includes a radio frequency transponder disposed in each removable dish. The code identification mechanism can include a tang extending from each removable dish and a plurality of switches disposed within the cavity. Each switch is associated with one of a plurality of pre-defined codes. The tang of a given removable dish is in contact with one of the switches when the given removable dish is disposed in the cavity. In one embodiment, the code identification mechanism includes a conductive bridge disposed in each removable dish and a plurality of electrical contacts disposed in the cavity. Each pairing of the electrical contacts corresponds to one of a plurality of pre-defined codes, and the conductive bridge on each removable dish is in contact with a unique pair of electrical contacts when that removable dish is disposed in the cavity.

In one embodiment, the code identification mechanism includes a plurality of magnetic switches disposed in the cavity. Each magnetic switch corresponds to one of a plurality of pre-defined codes. The mechanism also includes a magnetic actuator disposed in each removable dish. The magnetic actuator of a given removable dish actuates one of the magnetic switches when that removable dish is disposed in the cavity. In one embodiment, the animal feeding system also includes a plurality of remote radio frequency transceivers in communication with the control unit and capable of receiving radio frequency signals from the plurality of radio frequency transponders.

DETAILED DESCRIPTION

Animal feeders and animal feeding systems in accordance with the present invention utilize radio frequency identification (RFID) technology to identify specific animals and to make food available to those animals, for example, in accordance with a prescribed feeding schedule while preventing other animals access to the same food. The animal feeding system can be used with any type of animal including both wild animals and domestic animals including house pets and livestock. The animal feeder can be used in homes, zoos, animal hospitals, animal shelters, aquatic environments and farms. In addition, the animal feeder can be used in both land applications, for example in homes for dogs, cats and birds, and aquatic environments. Suitable radio frequencies are chosen to be compatible with and to not cause interference with other radio frequencies including those used in pet tags placed under the skin of an animal for purposes of animal identification, i.e., lost pet tagging, Bluetooth and Wi-Fi.

A radio frequency transceiver, which is also referred to as a reader or interrogator, and antenna are used in conjunction with a radio frequency transponder. The radio frequency transceiver is disposed in the base of the animal feeder and is in communication with and controlled by a control unit that is also disposed in the base. A pre-defined code in the form of a specified transmission frequency or an alpha-numeric code is received from the transponder by the transceiver and communicated to the control unit. Suitable pre-defined codes include, but are not limited to, a pre-defined radio frequency transponder emitted transmission frequency, a pre-defined alpha-numeric code and combinations thereof. The pre-defined code is pre-programmed into or communicated to the control unit, which then stores this code for use in analyzing signals received from transponders. Any suitable method can be used to communicate the desired code to the control unit. Preferably, the placement of a removable dish within the base of the feeder communicates a pre-defined code associated with that removable dish to the control unit. The control unit then monitors incoming signals for a match with the selected pre-defined code.

A plurality of radio frequency transmitters, tags or transponders that transmit signals containing codes to the transceiver contained in the base of the feeder in response to interrogation from the radio frequency transceiver are provided with a plurality of different codes. These codes are matched to codes associated with the removable dishes. Although each removable dish can be provided with a unique code and one of the transponders can be provided with a matching unique code, preferably, a pre-determined finite number of codes, for example six, eight, nine, ten or fifty different codes are selected and multiple removable dishes and transponders are programmed with a common code selected from one of the finite number of pre-determined codes. Therefore, all of the removable dishes and transponders associated with a given code can be used interchangeably, and if a transponder is lost or damaged, that unit can be replaced with another transponder programmed with the same code. The removable dish does not have to be replaced, and the base containing the transceiver can be used with any of the dishes or transponders. In one embodiment, indicia, for example color coding, are used to indicate the transponders and removable dishes that are associated with a given code. If a red bowl is placed in the base, then a red transponder is used.

The transponders are arranged to be worn by or to be attached to an animal. When the animal wearing the corresponding radio frequency transponder approaches the feeder base containing a dish within range of the RFID system, a lid associated with the feeder base opens, permitting access to the feed or food contained in the removable dish located within the feeder base. If the control unit determines that a radio frequency transponder emitting a signal or code that does not match the pre-defined code is being received by the radio frequency transponder in the feeder base, the control unit maintains the lid in a closed position for the entire length of time that the non-matching code is being received. Therefore, other animals associated with radio frequency transponders having different codes are prohibited from eating the food of the animal associated with the radio frequency transponder having the proper code.

Figure 1:
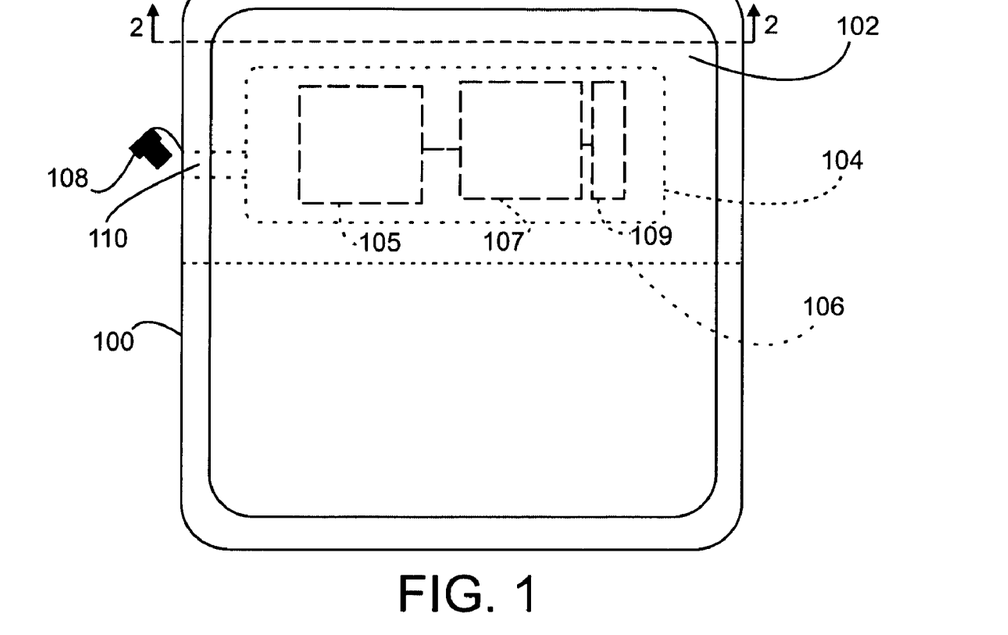
FIG. 1 is a plan view of an embodiment of a base to be used in the animal feeder of the present invention.
Figure 2:
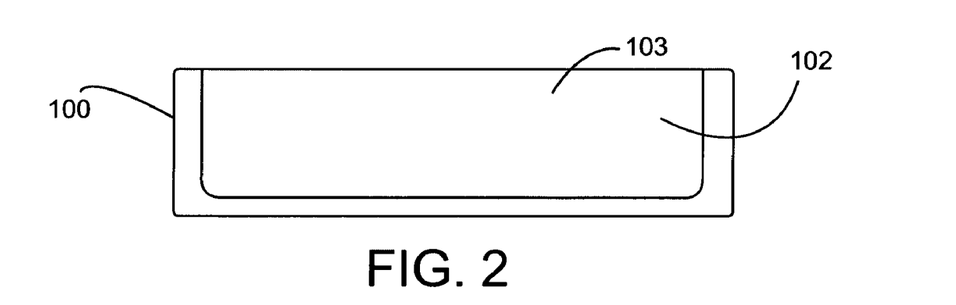
FIG. 2 is a view through line 2-2 of FIG. 1.

Referring initially to FIGS. 1 and 2, an exemplary embodiment of an animal feeder in accordance with the present invention includes a feeder base 100. As illustrated, the base 100 is substantially square; however, the base can be any shape including, but not limited to, circular, diamond, rectangular, triangular, hexagonal, octagonal, pentagonal and other geometric shapes. As illustrated, the base is a square having a length and width of about eight inches. However, the size of the base is determined by the feeder application. Larger animals, for example large dogs or livestock, require larger feeders. In one embodiment, the base is sized so that one or two servings or portions of feed for a given animal can be held within the feeder. The base includes at least one open cavity 102, having an open top 103 or opening. Therefore, the base is generally bowl shaped. Alternatively, the base could include a plurality of open cavities. Suitable materials for the base include metals such as stainless steel, ceramics, polymers and plastics, e.g., #7, #5 and #6 recyclable plastic, and combinations thereof. In general, the materials are dishwasher safe and shatter and chip resistant. These materials can be opaque, translucent or transparent. In one embodiment, the base includes a non-skid surface, i.e., rubberized floor or surface contact areas, to prevent tipping or slipping and elevated areas (not shown) for easy lifting.

Also contained within the base below the cavity are all of the control electronics 104 for the animal feeder. These control electronics 104 include a radio frequency transceiver, reader or interrogator 107 capable of receiving radio frequency signals from a plurality of radio frequency transponders or tags. An antenna 109 is also provided in communication with the radio frequency transceiver to aid in the transmission of excitation waves and the receipt of retransmission signals from the transponders. Various arrangements for the antenna are possible including an antenna that extends around the perimeter of the feeder base. The control electronics also include a control unit 105 in communication with the radio frequency transceiver and capable of interpreting radio frequency signals received by the radio frequency transceiver. The control unit includes all of the electronic and electrical circuitry to control the operation of the animal feeder. This circuitry includes, but is not limited to a central processing unit (CPU), a programmable logic controller (PLC), memory including random access (RAM) and read only memory (ROM) and electrically erasable programmable read-only memory (EEPROM).

The control electronics can also include power sources such as batteries including rechargeable batteries and the components necessary for networking through wired and wireless communication mechanisms including Blue Tooth and radio-based local area network (LAN) protocols, i.e., WiFi. Suitable power sources and networking components are known and available in the art. In one embodiment, the power supply is an AC or DC power source with battery back-up. As illustrated, a plug outlet 110 is provided in the base in communication with the control electronics 104 to provide power to the control unit and transceiver or to charge a rechargeable battery contained within the base. Suitable rechargeable batteries include, but are not limited to, nickel metal hybrid (NIMH) and lithium-ion batteries. In addition, the necessary charging unit electronics are provided. The plug outlet can be arranged for either an alternating current (AC) or a direct current (DC) power source. A rubber plug 108 or other similar stopper can be provided to cover and to protect the plug outlet 110. In one embodiment, all of the control electronics including the control unit and the radio frequency transceiver are encapsulated or potted in a waterproof compound, for example an epoxy compound. Suitable potting compounds are known and available in the art. Therefore, the entire base can be cleaned or washed by hand or in a mechanical dishwasher without damaging the electronics. Moreover, the electronics are protected from animal drool, animal waste or liquids that may be in proximity to the animal feeder. In one embodiment, the base includes a compartment 106, for example a sliding tray, to accommodate ice packs or similar items that can be used as a cooling mechanism for the animal feeder. In one embodiment, the tray is a cooling mechanism, negating the need for ice or gel packs. In one embodiment, the cooling tray mechanism is encapsulated to withstand, for example, the heat of a dishwasher. In one embodiment, all control electronics can be removed from the feeder as a cassette or "smart-card" type arrangement to provide for protection of the electronic components during cleaning of the base.

Figure 3:
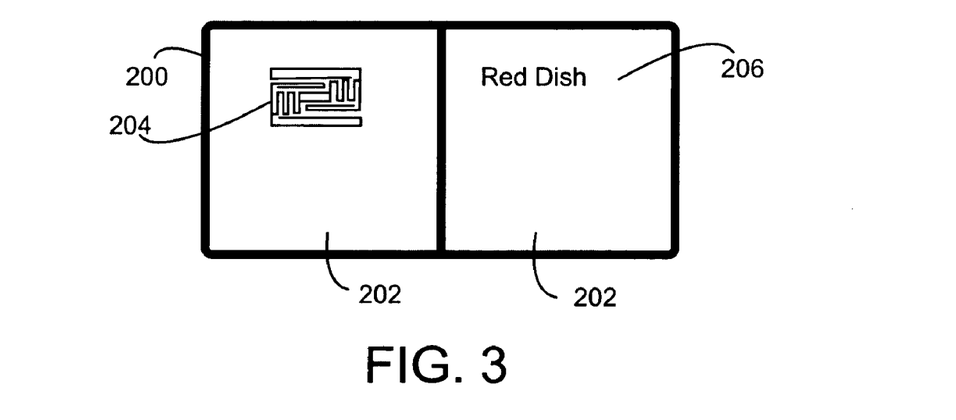
FIG. 3 is a plan view of an embodiment of a removable dish to be used in the animal feeder of the present invention.

Referring to FIG. 3, the animal feeder includes at least one removable tray or dish 200 sized to fit within the cavity and to be accessible through the open top of the cavity. The removable dish can be any size up to the size of the cavity and can have a single compartment 202 or a plurality of compartments 202 for holding different types of feed. In one embodiment, a plurality of removable dishes are provided, for example two removable dishes, that are sized to all fit within the cavity of the base as illustrated, for example in FIG. 4. Any desired arrangement in the number of removable dishes and the compartments contained within each dish can be accommodated. The removable dishes can accommodate moist or dry food and can include graduations showing ¼ cup, ½ cup and ¾ cup or other capacity levels including metric or SI unit measurements.

Figure 4:
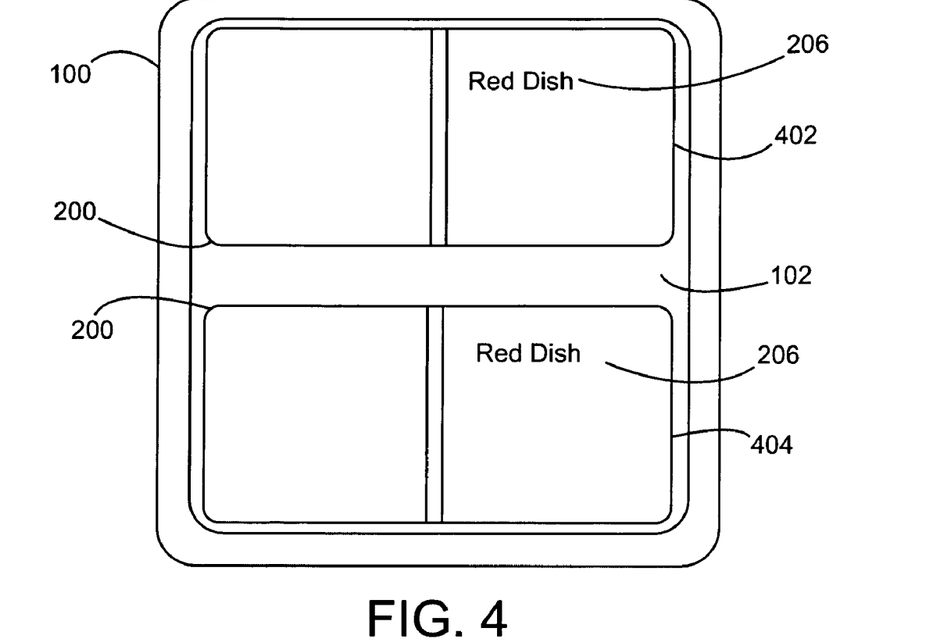
FIG. 4 is a plan view of an embodiment of the base holding two dishes.

In order to provide the control unit with the desired or appropriate pre-defined code for animal recognition and feeding, a code indication mechanism is provided that is disposed in feeder base, one or more of the removable dishes or both the base and the dishes to communicate a pre-defined code to the control unit. The code identification mechanism can include or can utilize the control electronics in the base including the radio frequency transceiver as well as additional mechanical, electronic and magnetic switches as well as electric leads disposed in the cavity of the base. When the cavity is holding more than one removable dish, each one of the plurality of dishes can communicate the same pre-defined code to the control unit or a different pre-defined code. In addition, a single removable dish can be used to communicate a plurality of codes to the control unit based on the orientation of the removable dish within the cavity. In this embodiment, a plurality of pre-defined codes are provided and communicated to the control unit such that each pre-defined code corresponds to one of the plurality of distinct orientations of the removable dish. As illustrated in FIGS. 3 and 4, for example, each removable dish can be placed in either the top location 402 or the bottom location 404 and can be rotated either 90, 180 or 270 degrees. Therefore, a single removable dish can be used to communicate a plurality of pre-defined codes to the control unit.

In one embodiment, the code indication mechanism includes a radio frequency transponder 204 (FIG. 3) disposed in or attached to each removable dish 200. This radio frequency transponder can be interrogated by the radio frequency transceiver in the feeder base and can communicate the appropriate pre-defined code to the control unit. The radio frequency transponder can be attached to the bowl using an adhesive or bonding agent or can be integrated into the removable dish, for example when the dish is molded.

Figure 6:
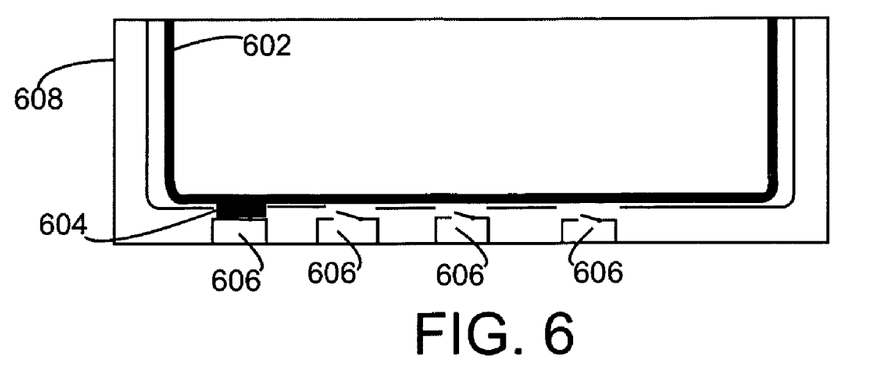
FIG. 6 is a schematic representation of an embodiment of a code recognition mechanism for use in the animal feeder.

In one embodiment as illustrated in FIG. 6, the code identification mechanism is a mechanical system that includes at least one tang 604 extending from the removable dish 602 into the cavity of the base 608. A plurality of switches 606 are provided disposed within the cavity. Each switch is associated with one of a plurality of pre-defined codes and is in communication with the control unit. When the removable dish is placed in the cavity, the tang is in contact with one of the switches, communicating the associated code to the control unit. In addition, combinations of the switches can be associated with pre-defined codes, and the removable dish can have a plurality of tangs that contact two or more switches simultaneously. This provides for an increased number of codes to be accommodated by a single base having a given arrangement of switches.

Figure 7:
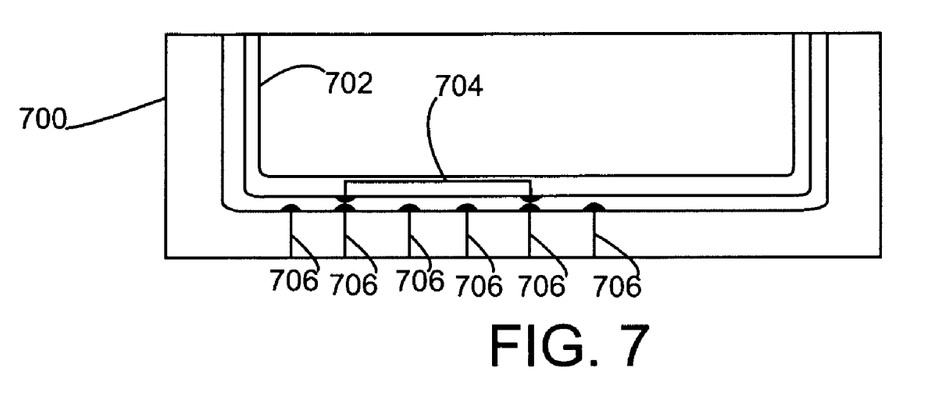
FIG. 7 is a schematic representation of another embodiment of a code recognition mechanism for use in the animal feeder.

In one embodiment as illustrated in FIG. 7, the code identification mechanism includes one or more conductive bridges 704 integrated into the removable dish 702. A plurality of electrical contacts 706 extend into the cavity of the base 700. Each electrical contact is in communication with the control unit, and each pairing of the electrical contacts corresponds to one of a plurality of pre-defined codes. Therefore, the conductive bridge connects a pair of the contacts when the removable dish is disposed in the cavity and communicates the associated code to the control unit.

Figure 8:
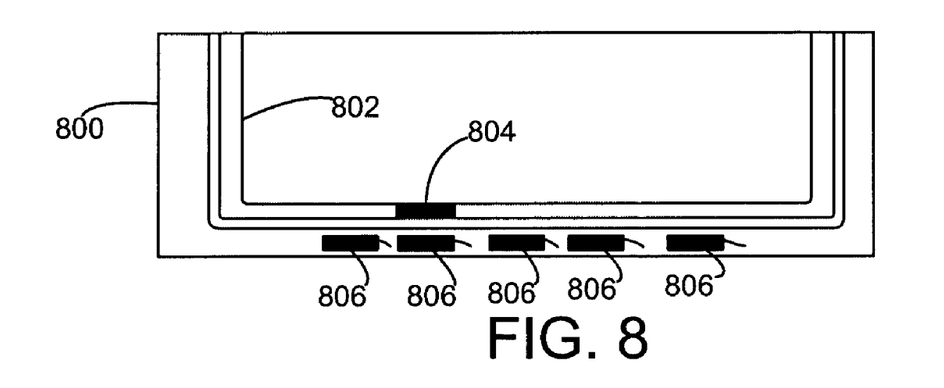
FIG. 8 is a schematic representation of another embodiment of a code recognition mechanism for use in the animal feeder.

In one embodiment as illustrated in FIG. 8, the code identification mechanism includes a plurality of magnetic switches 806 disposed in the cavity of the base 800. Each magnetic switch is in communication with the control unit and corresponds to one of a plurality of pre-defined codes. In addition, groupings of two or more magnetic switches can be associated with unique pre-defined codes. At least one magnetic actuator 804 is disposed in the removable dish 802. The magnetic actuator actuates one of the magnetic switches when the removable dish is disposed in the cavity, communicating the associated pre-defined code to the control unit. Alternatively, a plurality of magnets is provided in the removable dish. The magnets actuate a plurality of magnetic switches to communicate the associated code to the control unit.

Figure 5:
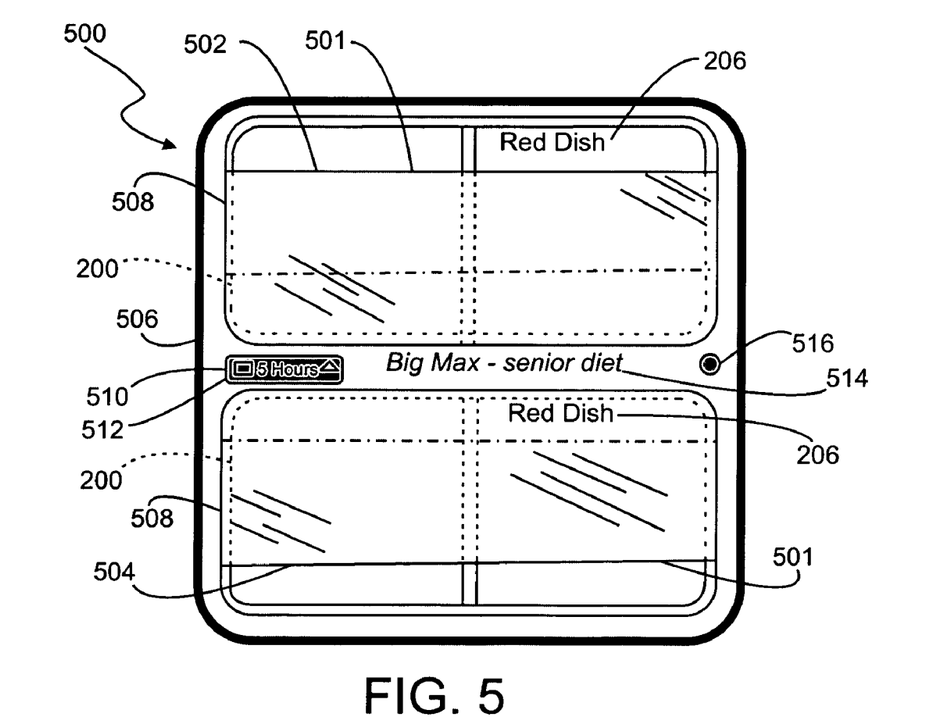
FIG. 5 is a plan view of an embodiment of the animal feeder of the present invention.

Since the animal feeder controls access to the food in the removable dish by animals, at least one lid is provided that can be controllably and selectively positioned in either a closed position that prevents access to the food or an open position that allows an animal access to the food contained within the removable dish. The lid can be constructed to be water tight, air tight or to form a vacuum seal by using the appropriate structures including gaskets and seals. In one embodiment, the lid is attached to the base to cover the open end of the cavity. In this embodiment, the base includes the mechanisms necessary to open and close the lid, and these mechanisms are in communication with and controlled by the control unit in the base. Referring to FIG. 5, in one exemplary embodiment of an animal feeder 500 in accordance with the present invention, a plurality of moveable lids 501 are provided that are attached to the base and selectively positionable in either a closed position covering the opening or open end of the cavity and an open position. The removable dishes are accessible through the opening when the lid is in the open position. As illustrated, the animal feeder includes two lids, a first lid 502 and a second lid 504 that are both in a partially opened position for purposes of illustration. Each lid is arranged to provide access to one of the two removable bowls disposed in the cavity. The lid is arranged with a desired fail-safe mode in the event of a power loss or power interruption. The lid can either open or remain open in the event of a power loss or can close or stay closed in the event of a power loss. In one embodiment, the fail-safe operation is accomplished using biasing members to bias the lid in either the open or closed position. In addition, the lid can be arranged to prevent catching or pinching an animal during closure. For example, the lid may not close entirely but may remain partially open a fraction of an inch. Alternatively, an audible signal or vibration can be delivered to alert the animal to the lid closing. In addition, the mechanisms driving the lid can be set in terms of drive strength to not generate sufficient force to harm an animal when closing.

In general, a variety of arrangements of removable dishes, dish compartments and lids can be provided. In one embodiment, a single removable dish can be provided with a single lid. Alternatively, a plurality of removable dishes can be provided with a plurality of lids, one lid for each dish. A single removable dish with a plurality of compartments can be provided with a plurality of lids, one lid for each compartment. In addition to multiple lids, a single lid can be provided is positionable in a plurality of open positions. In one embodiment, the removable dish includes a plurality of separate compartments, and the lid includes a plurality of open positions. Each open position corresponds to one of the plurality of separate compartments, and each separate compartment of the removable dish is accessible through the opening when the lid is in the corresponding open position. The multiple compartment dish or the multiple dishes can also be handled with a plurality of moveable lids each having an open position and a closed position as illustrated in FIG. 5. Each lid can be constructed of the same or different materials as the base and be transparent, translucent or opaque.

Figure 9:
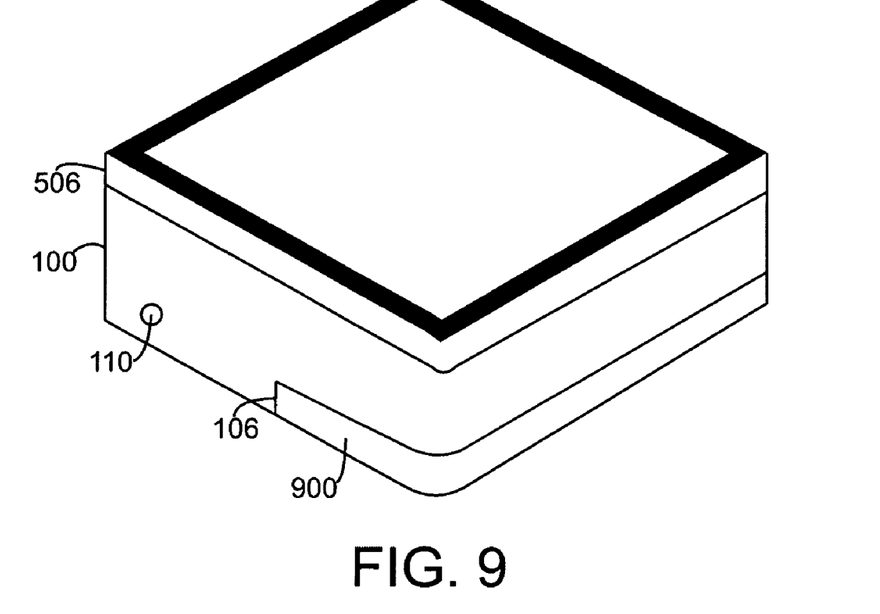
FIG. 9 is a top perspective view of an embodiment of an animal feeder shown in FIG. 5.

Although the lids can be attached directly to the base, preferably as illustrated in FIGS. 5 and 9, the lids are disposed within a top 506 assembly that can be partially or completely removed from the base, for example, the lid can be lifted straight up from the base as a single assembly, or moved to an open position to access the cavity for cleaning and for removal and insertion of the removable dishes. Suitable materials for the top are the same as for the base, and the top can be transparent, translucent or opaque. In one embodiment, includes notches or indentations (not shown) to provide for proper alignment of the compartments lids with the food compartments in the feeder base holding the food dishes. The top can define one or more openings 508 through which the removable dishes can be accessed when the appropriate lids are in the open position. In addition, the top can include the electronics, motors, solenoids, gears, biasing mechanisms and actuators required to open and close the lids. All electronic and electrical components contained within the top are in communication with the control electronics in the base. A biasing member, for example a spring, can be provided between each lid and the top or the base to bias each lid in either the open or closed position. The direction in which the lid is biased can be "fail safe" mode of the feeder.

The top can also include a manual programming button 510 for entering information into the control unit, a display 512 for indicating current status and program information, an erasable writing area 514 to allow user added information such as pet name and a low battery warning light 516. In one embodiment, the low battery light is a multi-function light that functions as a low battery warning light, an operational light and a power on/off or power status light. For example, a first color, e.g., green, indicating that the battery is charged and the power is on, a second color, e.g., amber, indicating a low battery, time to recharge and power is on, a third color, e.g., red, indicating that the battery is charging and the power is on and no light indicting a lack of power and that the unit cannot function. These features can also be contained within the base.

Referring to FIG. 9, in one embodiment, a slide out tray 900, for example a manual push and release type slide out tray, is provided in the base to hold an ice pack or other cooling mechanism in proximity to the removable dishes to assist in preserving the food until it is consumed by the animal. In addition, a heat source can be provided in the tray, for example to keep the food from freezing when the animal feeder is used in an outdoor application. In one embodiment, a plurality of remote radio frequency transceivers can be provided that are in communication with the control unit in the base for example through the WiFi or Blue Tooth communication capabilities. Each remote radio frequency transceiver is capable of receiving radio frequency signals from a plurality of radio frequency transponders. These remote transceivers are placed around the area of the base to provide for an increased area of coverage for detection of transponder signals. In one embodiment, the animal feeder includes an ant-free feeder base (not shown) arranged as a free-standing moat-style fixture into which the base is placed to prevent ants from gaining access to the food in the animal feeder.

Figure 10:
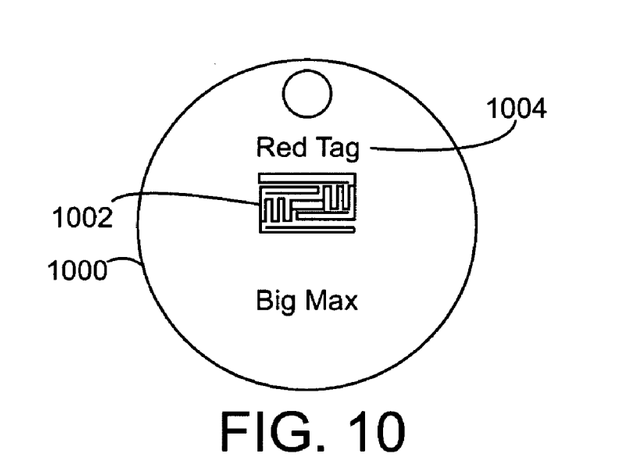
FIG. 10 is a representation of an embodiment of a transponder arranged as an animal tag for use in the animal feeder.
Figure 11:
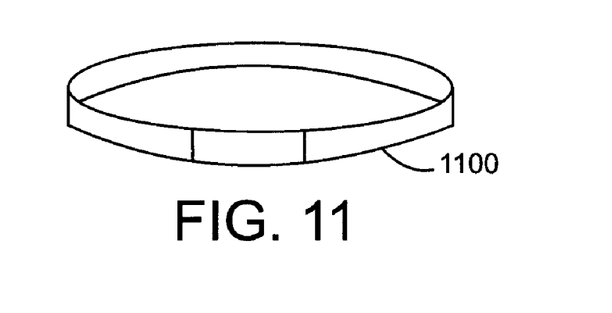
FIG. 11 is a representation of an embodiment of a transponder arranged as an animal collar for use in the animal feeder.
Figure 12:
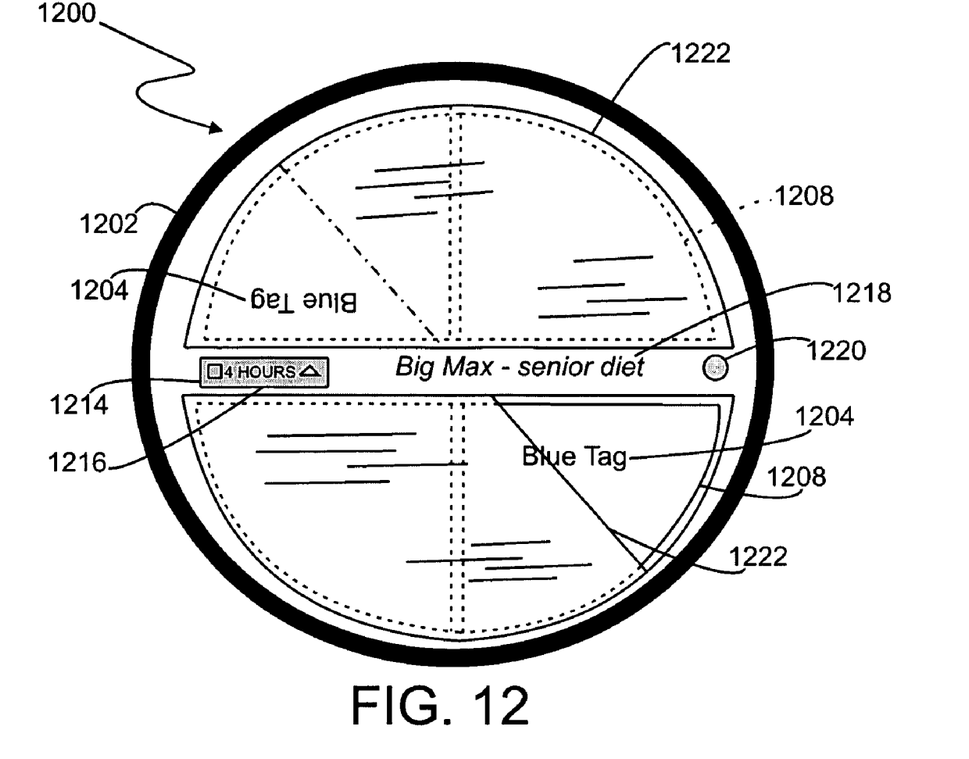
FIG. 12 is a plan view of another embodiment of the animal feeder of the present invention.
Figure 13:
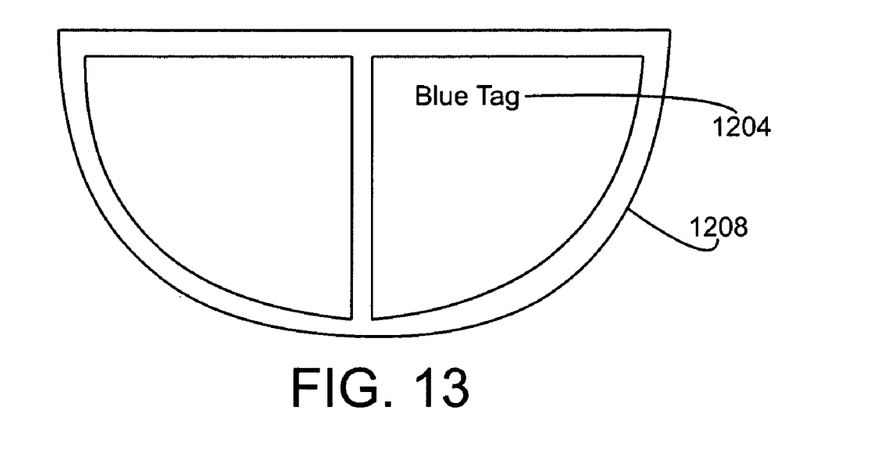
FIG. 13 is a plan view an embodiment of a removable dish to be used in the animal feeder of FIG. 12.
Figure 14:
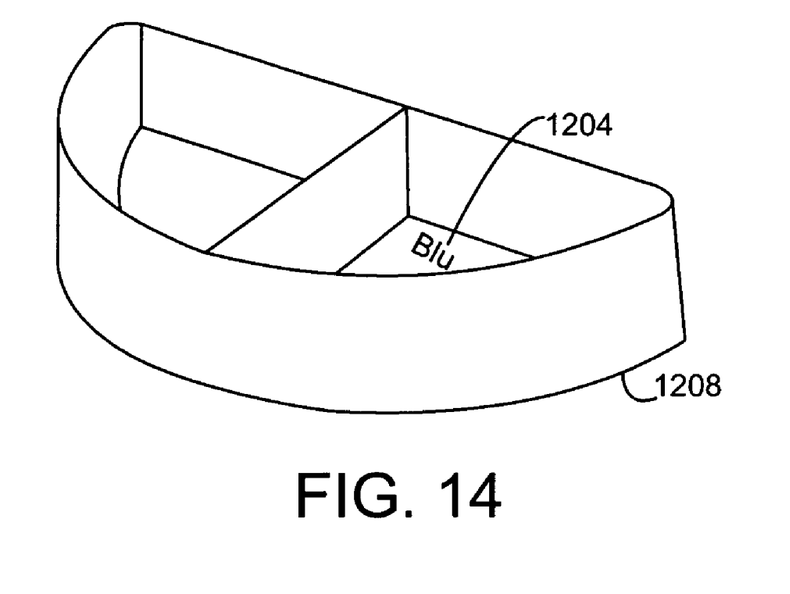
FIG. 14 is a top perspective view of the removable dish of FIG. 13.
Figure 15:
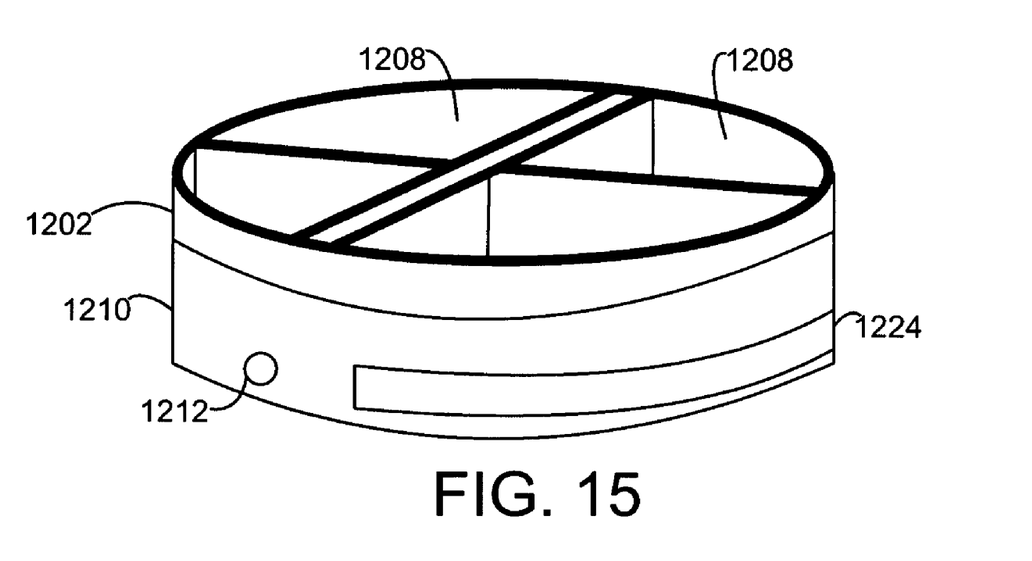
FIG. 15 is a top perspective view of the embodiment of an animal feeder shown in FIG. 12.

The animal feeder also includes at least one and preferably a plurality of radio frequency transponders that transmit the pre-defined code or pre-defined codes upon interrogation by the radio frequency transceiver. Any suitable type of radio frequency transponder can be used. Suitable transponders include passive transponders, semi-passive transponders and active transponders. In one embodiment, each radio frequency transponder is arranged for attachment to an animal. As illustrated in FIG. 10, the radio frequency transponder 1002 is included in a tag 1000 to be attached to an animal or animal collar. As illustrated in FIG. 11, the radio frequency transponder can be integrated directly into an animal collar 1100, for example, a break away type collar. Other suitable applications include tags such as ear tags and implants.

In one embodiment as illustrated in FIGS. 3-5, each removable dish includes a unique indicium 206 associated with each one of the plurality of pre-defined codes. Suitable indicia include any type of visual or tactile markings that can be read and understood by a user. As shown in FIG. 10, a corresponding unique indicium 1004 is disposed on each one of the corresponding radio frequency transponders. Indicia can also be disposed on the top and the base. Each indicium includes alpha-numeric strings, machine readable codes, colors, tactile markings and combinations thereof. In one embodiment, the entire removable dish is formed from a colored material. In general, the indicia provide a visual or tactile indication of the pre-defined code on the removable dish and the transponder, providing for an easy coupling of removable dishes and transponders. In one embodiment a button or token can be attached to the exterior of the feeder, for example on the exterior of the lid. The button is colored or contains the desired indicia to indicate the code on the dish contained within the cavity. The button can be circular or square and has a size of about one inch, or ½ inch or ¾ inch. The attachment mechanism allows for the easy attachment and removal of the button and can be a two-piece snap type attachment mechanism or two-sided tape.

The use of identifying indicia is important, because the removable dish communicates the code to the control unit, and the control unit derives codes from the signals received from the transponders worn by the animals. Matching signals are required to open the lids to gain access to the food within the animal feeder. Indicia provide for easy and reliable coupling of matching dishes and transponders. This arrangement provides for a pre-determined number or set of pre-defined codes to be used with interchangeable dishes and transponders. Therefore, if a given transponder or tag is lost or damaged, then a new correctly coded replacement tag can be purchased, and the same removable dish can be used. Similarly, a broken dish can be replaced without having to replace the transponder. Additionally, no reprogramming of transponders or transceivers is required. The use of a removable dish and corresponding transponders to communicate the codes provides for the use of a single universal base for all of the dishes and transponders.

In operation, the control unit is in operative communication with each lid in the animal feeder. Upon receipt of a radio frequency signal by the radio frequency transceiver in the base that contains the pre-defined code that corresponds to the pre-defined code associated with one of the removable dishes contained within the cavity, the control unit permits positioning of the appropriate lid in the open position. The control unit can also take into account other programmed or user-defined parameters including the time of day, the time since the last feeding and the temperature of the food in the removable dish. For example, a first dish or dish compartment can be made immediately available to a properly identified animal and a second dish or dish compartment is programmed to recognize the properly identified animal after a 4, 6, 8, 10 or 12 hour delay.

In one embodiment, the control unit, during an entire duration of receipt of any radio frequency signal interpreted to contain codes other than the pre-defined code associated with one of the contained dishes, maintains positioning of the lids in the closed position. Therefore, if animals containing other transponders associated with other pre-defined codes approach the animal feeder, the lid will immediately close or will remain closed. This prevents the consumption of the food by the wrong animal and eliminates problems caused, for example, by dominant animals at feeding time. The use of the remote radio frequency transceivers extents the reach of the base, and provides additional warning about the approach of an animal that is not to have access to the food.

The wireless networking capabilities of the control electronics allow for remote access and monitoring of the animal feeder. The animal feeder can be programmed remotely through a web-based or proprietary interface. In addition, the animal feeder can send out notifications via E-mail or text messaging regarding the status of the feeder and successful or failed feeding attempts. Wireless networking also facilitates automated logging and analysis of the feeding regime of a given animal. This information can then be provided to a veterinarian or dietary specialist for use in analyzing the health or activity of an animal.

In one embodiment, the animal feeder can be controlled and programmed using voice activated programming. All of the features of the animal can be activated, controlled using voice commands. These voice commands can be from a live voice, a machine generated voice, recorded voice or a transmitted voice, for example transmitted over a telephone line or compute network connection. Any suitable electronics for voice activation can be used. The voice can be a human voice or an animal voice. In one embodiment, the voice activation system is programmed to respond to only a particular human or animal voice. Therefore, only one person can control or change the settings of the animal feeder. Also, when an animal "voice" is used, the animal can be trained to produce an audible signal in order to obtain food. This can be used either separately or in combination with the RFID and other programming features. Additional biometric identification systems, for example fingerprints and retinal scans can be used.

Although described as a generally square-shaped feeder, other geometries are also possible including a circular geometry as illustrated in FIGS. 12-15. These other geometries would have all of the features and functions of the square-shaped feeder. In one embodiment, the circular animal feeder has a diameter of from about 9 to about 10 inches and a height of about 5 to about 5.5 inches. The circular embodiment animal feeder 1200 includes all of the features of the square embodiment including a base 1210 with the control electronics and a top 1202 containing the moveable lids 1222, manual programming button 1214, status display 1216, writable surface 1218 and low battery light 1220. As illustrated two removable dishes 1208 are provided with multiple compartments and indicia 1204. The dishes are semi-circular to fit within the circular cavity of the base. A power hook-up is provided 1212 along with the cold pack drawer 1224. The circular animal feeder functions like the square feeder and can use the same coded transponders.

The present invention is also directed to an animal feeding system utilizing animal feeders in accordance with the present invention. The animal feeding system utilizes the base and control unit in combination with a plurality of removable dishes and a plurality of radio frequency transponders. Each removable dish is sized to fit within the cavity and to be accessible through the opening, and each radio frequency transponder transmits one of a plurality of pre-defined codes upon interrogation by the radio frequency transceiver. The system utilizes the code indication mechanism disposed in the base and in each one of the removable dishes such that each removable dish communicates one of a plurality of pre-defined codes to the control unit. The removable dishes and transponders are grouped according to a common pre-defined code, and the dishes and transponders within a given group can be used interchangeably. Therefore, replacement of lost or damaged transponders and dishes is easy and inexpensive. In addition, a given base can be used with any of the dish and transponder groupings, minimizing the need for multiple bases of for purchasing a new base for a new application. The animal feeding system utilizes all of the components, embodiments and variations of the animal feeder of the present invention.

In one embodiment, the feeder base is arranged with a plurality of cavities or a plurality of dishes, and the feeder base is arranged to recognize more than one identification code. Therefore, for each code that the feeder recognizes, a lid is opened to expose one of the dishes or one of the cavities. For example, the base can include a plurality of cavities associated in pairs—first and second cavities, third and fourth cavities and fifth and sixth cavities. Each cavity includes a dish, and one of the cavities in each pair is immediately available, while the other cavity in the pair is programmed with a delay timer. In addition, each pair can have a different color code and can respond to a different code provided by a given transponder. Alternatively, each one of the plurality of compartments can be a single, larger compartment for all-day feeding, where the primary purpose is to maintain separate diets for multiple co-habitating animals.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s) and steps or elements from methods in accordance with the present invention can be executed or performed in any suitable order. Therefore, it will be understood that the appended claims are intended to cover all such modifications and embodiments, which would come within the spirit and scope of the present invention.

What is claimed is:

1. An animal feeder comprising:
   a base comprising:
   a cavity having an opening;
   a radio frequency transceiver capable of receiving radio frequency signals from a plurality of radio frequency transponders; and
   a control unit in communication with the radio frequency transceiver and capable of interpreting radio frequency signals received by the radio frequency transceiver;
   a removable dish sized to fit within the cavity and to be accessible through the opening; and
   a code indication mechanism comprising two parts and having a first part disposed in the removable dish and a second part disposed in the base to communicate a pre-defined code to the control unit.

2. The animal feeder of claim 1, further comprising:
   a lid attached to the base and selectively positionable in either a closed position covering the opening or an open position, the removable dish accessible through the opening when the lid is in the open position.

3. The animal feeder of claim 2, wherein the control unit is in communication with the lid, and the control unit, upon receipt of a radio frequency signal by the radio frequency transceiver containing the pre-defined code, permits positioning of the lid in the open position.

4. The animal feeder of claim 3, wherein the control unit, during an entire duration of receipt of any radio frequency signal interpreted to contain codes other than the pre-defined code, maintains positioning of the lid in the closed position.

5. The animal feeder of claim 2, wherein:
   the removable dish comprises a plurality of separate compartments; and
   the lid further comprises a plurality of open positions, each open position corresponding to one of the plurality of separate compartments and each separate compartment of the removable dish accessible through the opening when the lid is in the corresponding open position.

6. The animal feeder of claim 5, wherein the removable dish comprises two separate compartments and the lid comprises two open positions each open position corresponding to one of the two separate compartments.

7. The animal feeder of claim 2, further comprising a biasing member disposed in the base and in contact with the lid, the biasing member to bias the lid in the open position or the closed position.

8. The animal feeder of claim 1, wherein the pre-defined code comprises a pre-defined radio frequency transponder emitted transmission frequency, a pre-defined alpha-numeric code or combinations thereof.

9. The animal feeder of claim 1, wherein the code indication mechanism comprises a radio frequency transponder disposed in the removable dish.

10. The animal feeder of claim 1, wherein:
    the removable dish is positionable in the cavity in a plurality of distinct orientations; and
    the code indication mechanism further comprises a plurality of pre-defined codes, each pre-defined code corresponding to one of the plurality of distinct orientations of the removable dish.

11. The animal feeder of claim 10, further comprising visual indicia of the pre-defined code on at least one of the removable dish and the base.

12. The animal feeder of claim 1, wherein the code identification mechanism comprises:
    a tang extending from the removable dish; and
    a plurality of switches disposed within the cavity, each switch associated with one of a plurality of pre-defined codes;
    wherein the tang is in contact with one of the switches when the removable dish is disposed in the cavity.

13. The animal feeder of claim 1, wherein the code identification mechanism further comprises:
    a conductive bridge disposed in the removable dish; and
    a plurality of electrical contacts disposed in the cavity, each pairing of the electrical contacts corresponding to one of a plurality of pre-defined codes;
    wherein the conductive bridge is in contact with one pair of electrical contacts when the removable dish is disposed in the cavity.

14. The animal feeder of claim 1, wherein the code identification mechanism further comprises:
    a plurality of magnetic switches disposed in the cavity, each magnetic switch corresponding to one of a plurality of pre-defined codes; and
    a magnetic actuator disposed in the removable dish, the magnetic actuator actuating one of the magnetic switches when the removable dish is disposed in the cavity.

15. The animal feeder of claim 1, further comprising a radio frequency transponder that transmits the pre-defined code upon interrogation by the radio frequency transceiver.

16. The animal feeder of claim 15, wherein the radio frequency transponder is arranged for attachment to an animal.

17. The animal feeder of claim 15, wherein the radio frequency transponder comprises a passive transponder, a semi-passive transponder or an active transponder.

18. The animal feeder of claim 15, further comprising visual indicia of the pre-defined code on the removable dish and the transponder.

19. The animal feeder of claim 1, further comprising a plurality of remote radio frequency transceivers in communication with the control unit and capable of receiving radio frequency signals from a plurality of radio frequency transponders.

20. The animal feeder of claim 1, wherein the control unit further comprises a wireless communication mechanism.

21. The animal feeder of claim 1, wherein the base further comprises an epoxy compound to encapsulate at least one of the radio frequency transceiver and the control unit.

22. The animal feeder of claim 1, further comprising a cooling mechanism in communication with the removable dish when the removable dish is disposed in the cavity.

23. An animal feeding system comprising:
    a base comprising:
    a cavity having an opening;
    a radio frequency transceiver capable of receiving radio frequency signals from a plurality of radio frequency transponders; and
    a control unit in communication with the radio frequency transceiver and capable of interpreting radio frequency signals received by the radio frequency transceiver;
    a plurality of removable dishes, each removable dish sized to fit within the cavity and to be accessible through the opening;
    a code indication mechanism comprising two parts and having a first part disposed in each one of the removable dishes and a second part disposed in the base, wherein each removable dish communicates one of a plurality of pre-defined codes to the control unit; and a plurality of radio frequency transponders, each radio frequency transponder transmitting on one of the plurality of pre-defined codes upon interrogation by the radio frequency transceiver.

24. The animal feeding system of claim 23, wherein each radio frequency transponder is arranged for attachment to an animal.

25. The animal feeding system of claim 23, wherein each radio frequency transponder comprises a passive transponder, a semi-passive transponder or an active transponder.

26. The animal feeding system of claim 23, further comprising a unique indicium associated with each one of the plurality of pre-defined codes, each unique indicium disposed on one of the plurality of removable dishes and one of the radio frequency transponders.

27. The animal feeding system of claim 26, wherein each indicium comprises alpha-numeric strings, machine readable codes, colors, tactile markings or combinations thereof.

28. The animal feeding system of claim 23, further comprising:

a lid attached to the base and selectively positionable in either a closed position covering the opening or an open position, a given removable dish disposed in the cavity accessible through the opening when the lid is in the open position.

29. The animal feeding system of claim 28, wherein the control unit is in communication with the lid, and the control unit, upon receipt of a radio frequency signal by the radio frequency transceiver containing the pre-defined code communicated to the control unit from one of the plurality of removable dishes currently disposed in the cavity, permits positioning of the lid in the open position.

30. The animal feeding system of claim 29, wherein the control unit, during an entire duration of receipt of any radio frequency signal interpreted to contain codes other than the pre-defined code communicated to the control unit from the removable dish currently disposed in the cavity, maintains positioning of the lid in the closed position.

31. The animal feeding system of claim 28, wherein:

each removable dish comprises a plurality of separate compartments; and the lid further comprises a plurality of open positions, each open position corresponding to one of the plurality of separate compartments and each separate compartment of the removable dish accessible through the opening when the lid is in the corresponding open position.

32. The animal feeding system of claim 23, wherein each pre-defined code comprises a pre-defined radio frequency transponder emitted transmission frequency, a pre-defined alpha-numeric code or combinations thereof.

33. The animal feeding system of claim 23, wherein the code indication mechanism comprises a radio frequency transponder disposed in each removable dish.

34. The animal feeding system of claim 23, wherein the code identification mechanism comprises:

a tang extending from each removable dish; and a plurality of switches disposed within the cavity, each switch associated with one of a plurality of pre-defined codes;

wherein the tang of a given removable dish is in contact with one of the switches when the given removable dish is disposed in the cavity.

35. The animal feeding system of claim 23, wherein the code identification mechanism further comprises:

a conductive bridge disposed in each removable dish; and a plurality of electrical contacts disposed in the cavity, each pairing of the electrical contacts corresponding to one of a plurality of pre-defined codes;

wherein the conductive bridge on each removable dish is in contact with a unique pair of electrical contacts when that removable dish is disposed in the cavity.

36. The animal feeding system of claim 23, wherein the code identification mechanism further comprises:

a plurality of magnetic switches disposed in the cavity, each magnetic switch corresponding to one of a plurality of pre-defined codes; and a magnetic actuator disposed in each removable dish, the magnetic actuator of a given removable dish actuating one of the magnetic switches when that removable dish is disposed in the cavity.

37. The animal feeding system of claim 23, further comprising a plurality of remote radio frequency transceivers in communication with the control unit and capable of receiving radio frequency signals from the plurality of radio frequency transponders.

* * * * *